(12) United States Patent
Frascolla et al.

(10) Patent No.: US 6,377,378 B1
(45) Date of Patent: Apr. 23, 2002

(54) SUPPRESSION OF POLARIZATION HOLE BURNING WITH AN ACOUSTO-OPTIC MODULATOR

(75) Inventors: Massimo Frascolla, Novara; Filippo Bentivoglio Ravasio, Bergamo; Paolo Ottolenghi, Sceaux; Steffen Schmid, Monza, all of (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/220,332

(22) Filed: Dec. 24, 1998

Related U.S. Application Data (60) Provisional application No. 60/071,720, filed on Jan. 16, 1998.

(51) Int. Cl.$^7$ .......................... H04J 14/02; H04B 10/00; H04B 10/04
(52) U.S. Cl. .......................... 359/156; 359/124; 359/121
(58) Field of Search .................................. 359/156, 181, 359/182, 187, 337

(56) References Cited

U.S. PATENT DOCUMENTS

| | | | |
|---|---|---|---|
| 5,107,358 A | 4/1992 | Hodgkinson et al. | 359/124 |
| 5,127,066 A * | 6/1992 | Poggiolini | 385/24 |

(List continued on next page.)

FOREIGN PATENT DOCUMENTS

| | | |
|---|---|---|
| DE | 44 33 844 | 3/1996 |
| EP | 0 277 427 | 8/1988 |
| EP | 0 615 356 | 9/1994 |
| EP | 0 660 548 | 6/1995 |
| EP | 0 737 880 | 10/1996 |
| EP | 0 757 276 | 2/1997 |

OTHER PUBLICATIONS

R. Noe et al., "Depolariser Based on Acousto–Optical TE–TM Converters For Suppression Of Polarisation Hole-burning in Long Haul EDFA Links".
Electronics Letters, vol. 30, No. 18, Sep. 1, 1994, pp. 1500–1501. F. Heismann, "Compact Electro–Optic Polarization Scramblers for Optically Amplified Lightwave Systems", Journal of Lightware Technology, vol. 14, No. 8, Aug. 1996, pp. 1801–1814.

(List continued on next page.)

*Primary Examiner*—Leslie Pascal
*Assistant Examiner*—Dalzid Singh
(74) *Attorney, Agent, or Firm*—Finnegan, Henderson, Farabow, Garrett & Dunnner, L.L.P.

(57) ABSTRACT

An apparatus and method for reducing polarization hole burning in a rare-earth-doped fiber amplifier within an optical communication system by converting an optical carrier having a characteristic wavelength into a polarization-rotating optical carrier is disclosed. The apparatus includes a polarization-fixing device optically coupled in the optical transmission system to transform the optical carrier to a polarized optical carrier, and an acousto-optic modulator positioned to receive a first portion of the polarized optical carrier and to orthogonally convert the polarization of the polarized optical carrier and to shift the polarized optical carrier by a modulation frequency. The apparatus and method further includes a polarization beam combiner optically coupled to receive the orthogonally polarization converted and frequency shifted polarized signal and a portion of the original polarized optical carrier. The polarization beam combiner produces a polarization-rotating carrier signal that is transmitted downstream in the optical communication system to a rare-earth-doped fiber amplifier.

15 Claims, 5 Drawing Sheets

U.S. PATENT DOCUMENTS

| | | | |
|---|---|---|---|
| 5,327,511 A | | 7/1994 | Heismann et al. ............. 385/1 |
| 5,400,166 A | * | 3/1995 | Huber ........................ 359/173 |
| 5,491,576 A | | 2/1996 | Bergano ..................... 359/156 |
| 6,097,525 A | * | 8/2000 | Ono et al. .................. 359/181 |

OTHER PUBLICATIONS

M. Rehage et al., "Wavelength–Selective Polarisation Analyser with Integrated Ti :LiNbO$_3$ Acousto–Optical TE–TM Converter", Electronic Letters, vol. 30, No. 14, Jul.7, 1994, pp. 1130–1131.

F. Heismann et al., "Electro–Optic Polarization Scramblers for Optically Amplified Long–Haul Transmission Systems", ECOC '94, (1994), pp. 629–632.

N. Bergano et al., "Polarization Hole–Burning in Erbium–Doped Fiber–Amplifier Transmission Systems", ECOC '94, (1994), pp. 621–628.

* cited by examiner

SUPPRESSION OF POLARIZATION HOLE BURNING WITH AN ACOUSTO-OPTIC MODULATOR

This application claims the benefit of provision application 60/071,720, filed Jan. 16, 1998.

BACKGROUND OF THE INVENTION

The present invention relates generally to methods and systems for suppressing polarization hole burning in rare-earth doped fiber amplifiers. More particularly, the present invention relates to methods and systems for suppressing polarization hole burning using acousto-optic modulation to vary a state of polarization of an input signal.

Long distance optical communication systems have been known to suffer from various polarization dependent effects that may cause a signal-to-noise ratio of the system to lessen. Polarization hole burning (PHB) is one of the polarization dependent phenomena that can severely impair the performance of erbium-doped fiber amplifiers (EDFAs) located in optical fiber communication systems. PHB occurs when a strong, polarized optical signal is launched into an EDFA and causes anisotropic saturation of the amplifier. This effect, which is related to the population inversion dynamics of the EDFA, depresses the gain of the EDFA for light with the same polarization as the saturating signal. Thus, PHB causes a signal having a state of polarization (SOP) orthogonal to the saturating signal to have a gain greater than that of the saturating signal.

In a chain of saturated EDFAs, amplified spontaneous emission (ASE) noise can accumulate faster in the polarization orthogonal to a saturating information signal than along the polarization parallel to the signal. ASE orthogonal to a saturating signal will accumulate at each amplifier stage of the transmission line. The build-up of orthogonal ASE reduces the signal-to-noise ratio (SNR) of the optical transmission system, thus causing possible errors in the received data stream. Accordingly, it is desirable to reduce the effects of PHB in amplified systems in order to maintain a system with good SNR characteristics.

Operating EDFAs in gain compression helps to cause the undesired PHB effect. The degree of gain compression Cp indicates the difference of gain of the amplifier in its operative condition of propagation of a signal with low optical power (i.e., a non-saturating signal experiencing maximum gain, called "Go") with respect to the value experienced by the optical signal in the power level condition at which it is operating (G). An amplifier's operating gain in decibels can be measured with a saturating signal of input power Si as the following:

$$G=So-Si, \quad (1)$$

where So is the saturated output power. Accordingly, the amount of gain compression equals the following:

$$Cp=Go-G. \quad (2)$$

The gain in the orthogonal polarization, on the other hand, can be measured using a probe signal with an input polarization orthogonal to the saturating signal as the following:

$$Po-Pi=G+\Delta G, \quad (3)$$

Pi and Po being the input and output power of the probe signal. In equation (3), $\Delta G$ corresponds to the PHB value.

Figure 1:
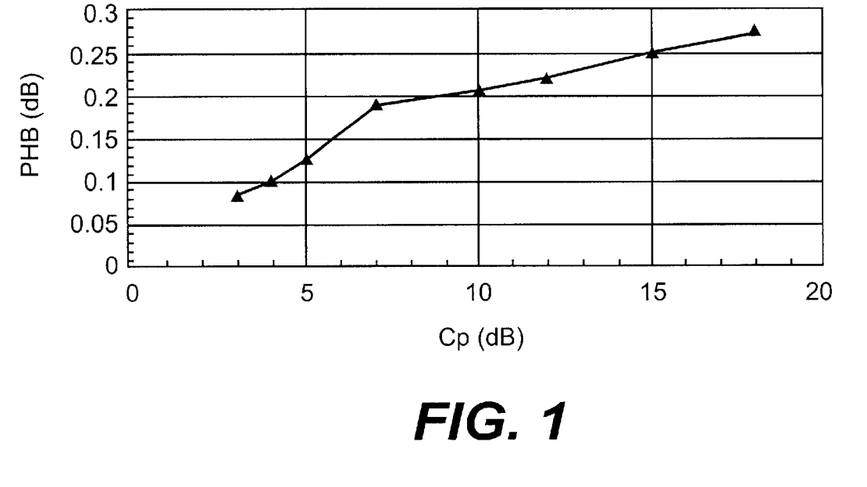
FIG. 1 is a graph illustrating a relationship between PHB and gain compression for a double stage erbium-doped fiber amplifier.

Moreover, the amount of PHB increases as the amplifier goes deeper into gain compression. FIG. 1 is a graph of experimental measurements showing the relationship between the amount of gain compression and the amount of PHB in an EDFA. As shown in this graph, the amount of PHB is only about 0.08 dB for a single EDFA that operates with 3 dB of gain compression. However, as the gain compression increases, so does the PHB. When the EDFA operates in a saturated condition with Cp equal to about 9–10 dB, the PHB is more significant and quantifiable at around 0.2 dB per EDFA.

Figure 2:
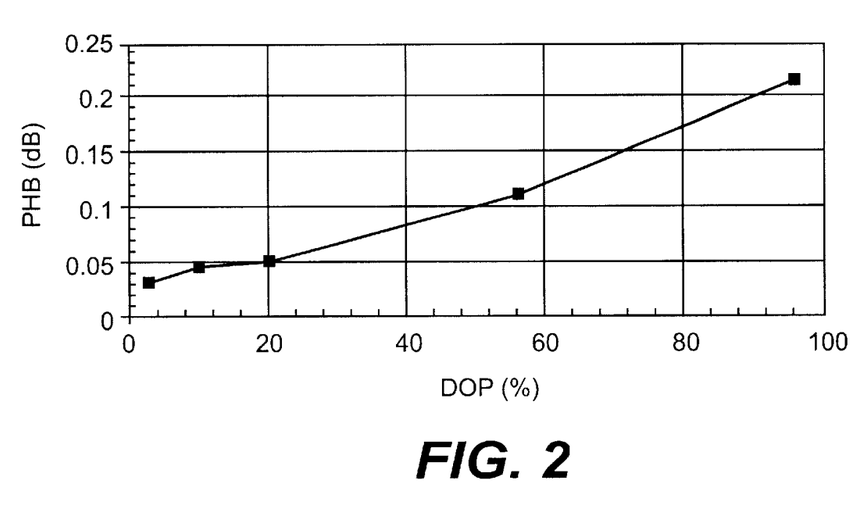
FIG. 2 is a graph illustrating a relationship between PHB and the degree of polarization of an optical information signal for a double stage EDFA with Cp=10 dB.

Furthermore, the amount of PHB in an EDFA depends on the degree of polarization (DOP) of the saturating signal passing through the amplifier. FIG. 2 is a graph of experimental results on an EDFA operating at 10 dB of gain compression. As can be seen from this graph of FIG. 2, as the degree of polarization of the saturating signal diminishes from 100%, the variation of gain induced by PHB also diminishes. This fact illustrates that the deleterious effects from PHB may be lessened by varying the state of polarization. PHB can be reduced by scrambling the SOP of the transmitted optical signal at a rate that is much higher than $1/t_s$, where $t_s$ is the anisotropic saturation time. Because an EDFA takes about 0.5 msec to reach a gain stable condition after variation of a signal's SOP, the signal's SOP should be scrambled at about 10 kHz or more in order to overcome the PHB phenomenon.

The literature has proposed several arrangements for mitigating PHB effects in optical communication systems. EP 615,356 and U.S. Pat. No. 5,491,576 disclose a technique for reducing nonlinear signal degradation by simultaneously launching two optical signals of different wavelengths, comparable power levels, and substantially orthogonal relative polarizations into the same transmission path. The resulting overall transmitted signal is therefore essentially unpolarized, and the impact of detrimental polarization dependent effects within the transmission system are reportedly minimized. The combined signal is modulated by a polarization independent optical modulator so that both wavelength components of the combined signal carry the same data, or each wavelength path is separately modulated prior to their combination. Similar disclosure of a system that launches two signals of different wavelengths can be found in Bergano et al., "Polarization Hole-Burning in Erbium-Doped Fiber-Amplifier Transmission Systems," ECOC '94, pp. 621–628.

U.S. Pat. No. 5,107,358 describes a method and apparatus for transmitting information and detecting it after propagation through a waveguide by means of a coherent optical detector. In particular, FIG. 3 shows a transmitter comprising an optical source generating a single carrier signal which is fed to a modulator. An optical splitter generates two versions of the modulated signal. The first version is fed to a first polarization controller, while the second version is fed via a frequency shifting circuit to a second polarization controller. The polarization of this signal is adjusted by the second controller to be orthogonal to the polarization of the signal from the first controller. The orthogonally polarized signals are then combined by a polarization selective coupler for transmission.

It should be understood that in all the examples described in the '358 patent, the two optical carrier frequencies will typically be separated by two to three times the bit rate in Hertz. Applicants have observed that by superposing an optical signal with a version of the same having orthogonal polarization and being shifted in frequency by two to three times the bit rate, an optical signal with a bandwidth of the same magnitude (two to three times the bit rate) is obtained. The bandwidth of the filters to be used at the receiver must be equal to or greater than the signal bandwidth. Due to this large filter bandwidth, the noise at the receiver, in the case of a long distance amplified optical telecommunication system, would be too high to allow a good signal reception, particularly for a bit rate greater than 1 Gbit/s.

It is also known from, for example, U.S. Pat. No. 5,327, 511 and Heismann et al., "Electro-optic polarization scramblers for optically amplified long-haul transmission systems," ECOC '94, pp. 629–632, to generate a carrier signal having a single wavelength, modulate the carrier signal with data, and then send the modulated carrier signal through a polarization modulator or scrambler to help alleviate the effects of polarization hole burning. These documents disclose the use of a lithium niobate-based electro-optic modulator with a single path for passing the carrier wavelength and modulating its polarization at, for example, modulation frequencies of 40 kHz and 10.66 GHz. These polarization modulators or scramblers create highly randomized polarization states for the signal. Such devices affect the output polarization according to a control signal and use relatively high levels of power.

From Electronics Letters, Vol. 30, No. 18, p. 1500–1501, Sep. 1, 1994 an acousto optical Ti:LiNbO$_3$ device is known whose transducer is placed at ⅓ of the interaction length, which forms a polarization-independent optical depolarizer consisting of two or more sections of a wavelength tunable TE–TM converter, suitable to suppress polarization hole-burning in EDFAs. The authors present a double stage depolarizer with a $\leq 0.03$ residual degree of polarization.

As well, acousto-optical waveguide devices are known that provide a polarization rotation to an input optical signal and modulate the signal with an acoustic wave from a modulation source. Relevant publications include, for example, EP 737,880, EP 757,276 and M. Rehage et al., "Wavelength-Selective Polarisation Analyser with Integrated Ti:LiNbO$_3$ Acousto-Optical TE–TM Converter," Electronics Letters, vol. 30, no. 14, Jul. 7, 1994.

Applicants have found that the known techniques for minimizing polarization hole burning using electro-optic modulators to rotate the polarization of a carrier signal require undesirably high levels of power. As well, Applicants have discovered that the known techniques for providing a polarization-rotating signal for an erbium-doped fiber amplifier require a much wider band width than is practically acceptable for a receiver in an optical transmission system. Furthermore, systems employing two sources at different wavelengths are difficult to implement, due to the problems in selecting the sources and in stabilizing their wavelengths. WDM transmission by this system would be very complicated and expensive.

SUMMARY OF THE INVENTION

In accordance with the present invention, an optical transmission system has been developed to help reduce polarization hole burning in a rare-earth-doped fiber amplifier by converting an optical carrier signal having a characteristic wavelength into a polarization-rotating optical carrier. The system employs an acousto-optic modulator that modulates a portion of the optical carrier. The acousto-optic modulator causes an orthogonal rotation of the polarization of the portion of the optical carrier. A polarization beam combiner then combines the modulated and orthogonal signal from the acousto-optic modulator with the remainder of the original optical carrier signal to produce a polarization-rotating optical carrier. The polarization-rotating optical carrier is inserted into the optical communication system for eventual use within a rare-earth-doped fiber amplifier.

To obtain the advantages and in accordance with the purpose of the invention, as embodied and broadly described herein, an apparatus for reducing polarization hole burning in a rare-earth-doped fiber amplifier within an optical communication system by converting an optical carrier having a characteristic wavelength and an initial state of polarization into a polarization-rotating optical carrier, includes an acousto-optic modulator and a polarization beam combiner. The acousto-optic modulator has a carrier input optically coupled to receive a first portion of the polarized optical carrier, a modulation input electrically coupled to receive an RF modulation frequency, and a modulator output. The acousto-optic modulator includes circuitry for orthogonally converting polarization of the polarized optical carrier and shifting the polarized optical carrier frequency by the modulation frequency. The polarization beam combiner has a first input optically coupled to receive the orthogonally SOP (State of Polarization) -converted and frequency-shifted polarized signal, a second input optically coupled to receive a second portion of the polarized optical carrier, and an output optically coupled to the rare-earth-doped fiber amplifier downstream in the optical communication system.

In another aspect, the invention includes an optical transmitter for reducing polarization hole burning in a rare-earth-doped fiber amplifier within an optical communication system having an optical source for transmitting an optical carrier having an initial state of polarization, a splitter, a modulation source for providing a modulation signal, an acousto-optic modulator, an attenuator, and a polarization beam combiner. The splitter is positioned downstream from the optical source, has an input, a first output, and a second output, and divides the optical carrier received at the input between the first output and the second output. The acousto-optic modulator has a carrier input optically coupled to the first output of the splitter, a modulation input electrically coupled to the RF modulation source, and a modulator output. The acousto-optic modulator includes circuitry for orthogonally converting polarization of the optical carrier and frequency shifting the optical carrier by the frequency of the modulation signal. The polarization beam combiner has a first input optically coupled to receive the orthogonally polarization converted and frequency-shifted optical signal, a second input optically coupled to the attenuator, and an output optically coupled to the rare-earth-doped fiber amplifier downstream in the optical communication system.

In another aspect, the present invention includes a method of suppressing polarization hole burning in a rare-earth-doped fiber amplifier within an optical communication system including the steps of splitting an optical carrier signal into a first sub-carrier signal and a second sub-carrier signal, and rotating orthogonally the polarization of the first sub-carrier signal and modulating the first sub-carrier signal with a RF modulation frequency to create an orthogonal-modulated sub-carrier signal. The method further includes the steps of combining the orthogonal-modulated sub-carrier signal and the second sub-carrier signal to produce a polarization-rotating carrier signal, and passing the polarization-rotating carrier signal downstream In the optical communication system to the rare-earth-doped fiber amplifier.

In a further aspect, the present invention includes an acousto-optic modulator for rotating the polarization of an optical carrier signal, comprising: a substrate of a birefringent and photo-elastic material; a first port on the substrate for receiving the optical carrier signal from an optical waveguide; a splitter having an input coupled to the first port, a first output, and a second output; a first optical waveguide branch coupled at one end to the first output of the splitter; a second optical waveguide branch coupled at one end to the second output of the splitter; an acoustic waveguide on the substrate including at least a portion of the first optical waveguide branch; an acoustic wave generator positioned on the substrate over at least a portion of the acoustic waveguide; and a polarization splitter having a first input coupled to another end of the first optical waveguide branch, a second input coupled to another end of the second waveguide branch, and an output.

It is to be understood that both the foregoing general description and the following detailed description are exemplary and explanatory only and are not restrictive of the invention as claimed. The following description, as well as the practice of the invention, set forth and suggest additional advantages and purposes of this invention.

BRIEF DESCRIPTION OF THE DRAWINGS

The accompanying drawings, which are incorporated in and constitute a part of this specification, illustrate embodiments of the invention, and together with the description, explain the advantages and principles of the invention.

DETAILED DESCRIPTION OF THE PREFERRED EMBODIMENTS

Reference will now be made to various embodiments according to this invention, examples of which are shown in the accompanying drawings and will be obvious from the description of the invention. In the drawings, the same reference numbers represent the same or similar elements in the different drawings whenever possible.

Figure 3:
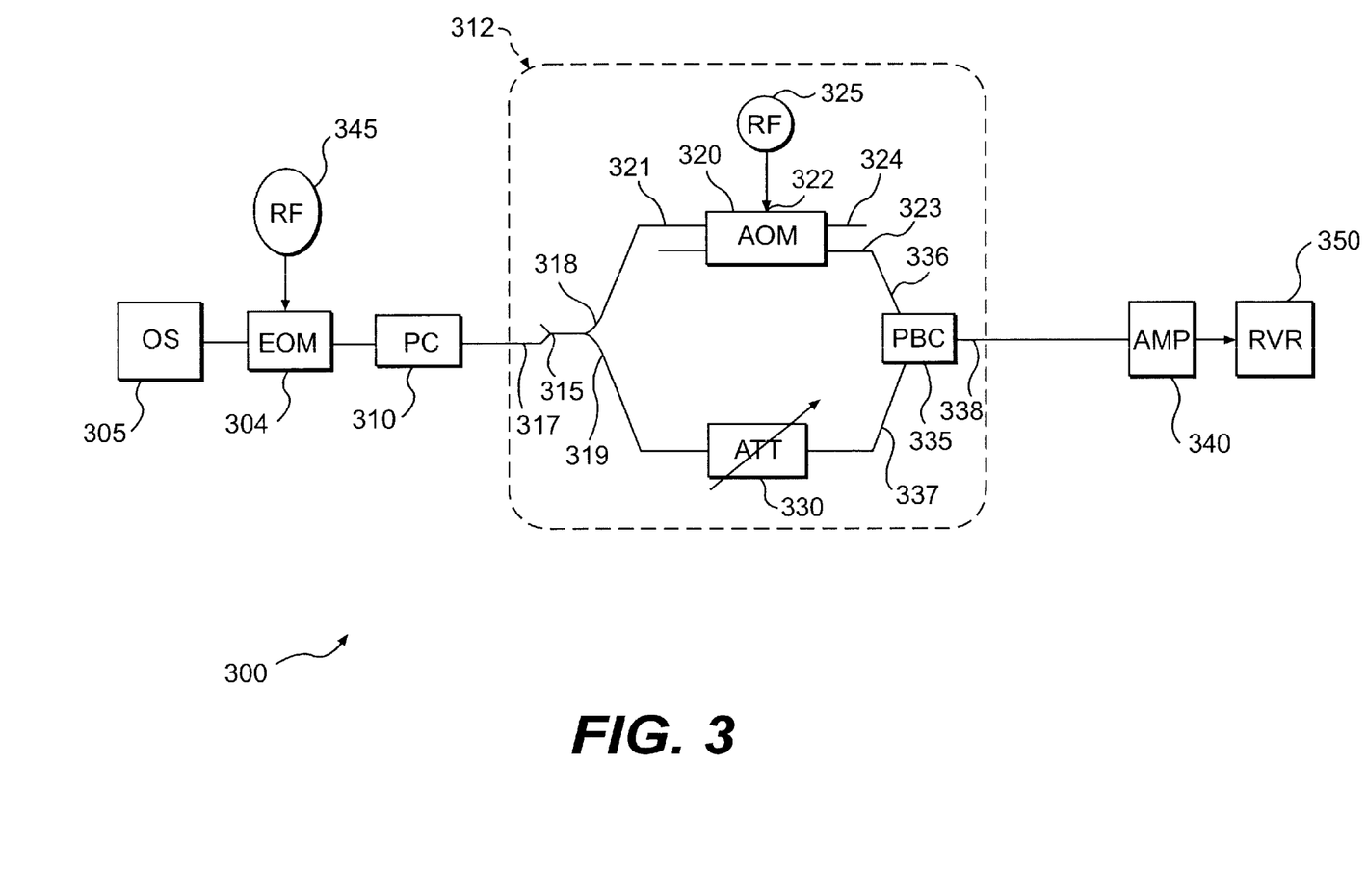
FIG. 3 is a block diagram showing an optical communication system using a polarization modulator according to one embodiment of the present invention.

As generally referenced at 300 in FIG. 3, an optical communication system consistent with the present invention includes a polarization modulator that reduces polarization hole burning in a rare-earth-doped fiber amplifier. The optical communication system shown generally at 300 comprises an optical source (OS) 305 for transmitting an optical carrier, a polarization-fixing device (PC) 310, and a polarization modulator 312. Polarization modulator 312 includes a splitter 315, an RF modulation source 325 for providing a modulation signal, an acousto-optic modulator 320, an attenuator 330, and a polarization beam combiner 335.

As referenced at 305 in FIG. 3, the optical source for transmitting an optical carrier comprises a laser diode or similar component for producing an optical signal having a relatively fixed wavelength. Optical source 305 generates the relatively fixed wavelength as a carrier signal that may be modulated by various techniques within the optical communication system 300, as described in more detail below. For example, optical source 305 is an AT & T DFB semiconductor laser having Model No. 246AH and operating at a nominal wavelength in vacuum of 1556.7 nm, having a line bandwidth of less than 100 MHz.

Downstream from optical source 305, optical communication system 300 may include an electro-optic modulator (EOM) 304 for modulating an information signal onto the carrier signal produced by optical source 305. As is readily known to one of ordinary skill in the art, electro-optic or data modulator 304 may be a Mach-Zehnder interferometer or equivalent device for providing an amplitude modulation on the optical carrier according to an electromagnetic signal introduced by source (RF) 345. The electromagnetic signal may be, for example, an RF signal containing data to be transmitted across optical communication system 300. The use of data modulator 304 is optional for the practice of the present invention but provides the feature of inserting information onto the carrier signal. As an alternative to data modulator 304, optical source 305 can be directly modulated. Multiple sources 305 at different emission wavelengths or a multiple wavelength source may be used in case of wavelength-division-multiplexing (WDM) transmission.

Downstream from optical source 305, and possibly also data modulator 304, polarization-fixing device 310 is optically coupled to transform the optical carrier from optical source 305 into an optical carrier having a fixed SOP corresponding to a preferred input SOP of polarization modulator 312. Naturally, if data modulator 340 is used within the optical communication system 300 described herein, polarization-fixing device 310 will convert the optical carrier that has been modulated with data by the data modulator 340 into a constant SOP optical carrier. Polarization-fixing device 310 is preferably a polarization controller that comprises a series of loops of an optical fiber that have an angular adjustment to provide a selected and fixed polarization for a signal output from the polarization controller. This type of polarization controller, which is readily known in the field, may be obtained in the marketplace or manufactured as desired by one of ordinary skill in the art. Alternative devices for the polarization-fixing device 310 include a polarization-maintaining fiber, a polarization-maintaining splitter, or a polarization stabilizer. Other structures not explicitly listed may alternatively be chosen for polarization-fixing device 310 such that the output of device 310 provides an optical signal having a fixed polarization.

The optical communication system 300 for reducing polarization hole burning further includes a polarization modulator shown generally as 312 in FIG. 3. Polarization modulator 312 includes splitter 315 positioned downstream from the polarization-fixing device 310. Splitter 315 has an input 317, a first output 318, and a second output 319, for example into first and second sub-carrier signals. Preferably, splitter 315 is a 3 dB coupler of the fused fiber variety that divides the polarized optical carrier received at input 317 from polarization-fixing device 310 between the outputs of 318 and 319.

In addition, the polarization modulator 312 consistent with the present invention further includes an acousto-optic modulator (AOM) 320 positioned downstream from splitter 315. Acousto-optic modulator 320 has a carrier input 321 optically coupled to the first output 318 of splitter 315. In this way, a portion of the polarized optical carrier passed by polarization-fixing device 310 is received by acousto-optic modulator 320 via input port 321. Acousto-optic modulator 320 also includes a modulation input 322, a modulator output 323, and additional output 324. Modulation input 322 is optically coupled to a modulation source (RF) 325 that provides a relatively fixed electromagnetic frequency to acousto-optic modulator 320. AOM 320 is preferably a waveguide device made on a LiNbO$_3$ substrate, e.g., as described in a paper by S. Schmid et al., Post Deadline Paper ThP1, pp. 21–24, Proceedings of the 7th European Conference on Integrated Optics, Delft, The Netherlands, Apr. 3–6, 1995. For a waveguide AOM made on a LiNbO$_3$ substrate, the frequency ν of the RF signal is, for example, about 172.6 MHz for an optical signal at a wavelength λ=1556.7 mm. The change in RF frequency Δν required to tune the AOM after a change Δλ of optical signal wavelength (tuning slope) is in the above example Δν/Δλ≈−120 kHz/nm. If a plurality of optical signals at different wavelengths are input to AOM 320, modulation source 325 will advantageously provide a corresponding number of modulation signals, each tuned to one optical signal.

As explained more fully below, acousto-optic modulator 320 modulates the polarized carrier by the modulation signal received at the modulation input 322, thereby orthogonally converting the polarization of the polarized carrier. That is, acousto-optic modulator 320 will provide a TE–>TM or TM–>TE conversion of the received polarized carrier signal. If polarization-fixing device 310 sets the polarization of the carrier signal at the TE (transverse electric) mode, acousto-optic modulator 320 will orthogonally rotate the TE mode to the TM (transverse magnetic) mode, or vice versa. Also, acousto-optic modulator will shift the optical frequency of the polarized carrier signal at the frequency of the RF modulating signal.

Coupled to the second output 319 of splitter 315 is an attenuator 330. Attenuator 330 may comprise an adjustable attenuator or a fixed attenuator, depending on the preferred design implementation. Attenuator 330 serves to adjust the magnitude of the portion of the polarized optical carrier received from the second output 319 of splitter 315 so that this second portion has a magnitude substantially equal to the magnitude of the orthogonal-modulated signal exiting from acousto-optic modulator 320 via output 323. As a result, polarization beam combiner (PBC) 335 of FIG. 3 receives an orthogonally-shifted and modulated polarized signal from acousto-optic modulator 320 and a portion of the original polarized optical carrier from attenuator 330, where the two received signals by polarization beam combiner 335 have substantially the same magnitude. As mentioned, attenuator 330 may be used to equalize the magnitudes of the two signals received by polarization beam combiner 335. Alternatively, splitter 315 may be an unbalanced splitter or coupler specifically designed with a ratio between the first output 318 and the second output 319 so that the two signals eventually received by polarization beam combiner 335 have substantially the same magnitudes.

As mentioned, polarization beam combiner 335 is positioned downstream from both the acousto-optic modulator 320 and the optional attenuator 330. Polarization beam combiner 335 has a first input 336 optically coupled to receive the orthogonally-shifted and modulated polarized signal from output 323 of acousto-optic modulator 320. As well, polarization beam combiner 335 has a second input 337 optically coupled to receive a portion of the polarized optical carrier from splitter 315, which may be passed via attenuator 330. In a known fashion, polarization beam combiner 335 will combine the orthogonally-polarization converted and frequency-shifted polarized signal received from acousto-optic modulator 320 with the portion of the original polarized optical signal received from splitter 315 to produce a polarization-rotating carrier signal. This polarization-rotating carrier signal will have substantially the same wavelength as the original carrier signal generated by optical source 305, but will have a state of polarization that will vary at a rate proportional to the modulation frequency generated by modulation source 325. In the preferred embodiment, this modulation frequency is about 172.6 MHz. As a result, the overall polarization modulator 312 of the present invention, as defined by splitter 315, acousto-optic modulator 320, attenuator 330, and polarization beam combiner 335, changes the state of polarization of the original carrier signal at a very high rate. This rate of change of the state of polarization exceeds the response time of an erbium-doped fiber amplifier, which is defined by 1/t$_s$, where t$_s$ is the anisotropic saturation time. Typically, t$_s$≧0.5 μs for erbium-doped fiber amplifiers.

Polarization beam combiner 335 is, for example, Model PB100-1L-1S-FP by JDS-FITEL. Polarization beam combiner 335 also has an output 338 optically coupled to at least one rare-earth-doped fiber amplifier 340 positioned downstream in the optical communication system 300. The rare-earth-doped fiber amplifier is preferably an erbium-doped fiber amplifier. Single-stage, two-stage or multiple-stage amplifiers can be used. It is possible to use a plurality of amplifiers separated from each other by links of long distance transmission fiber (not shown). In a test setup, a polarization filter (Glen-Thomson prism) was positioned downstream from polarization beam combiner 335 for detecting rotation of the signal polarization. A polarization filter, however, is normally not comprised in an apparatus for reducing polarization hole burning as herein described.

As in conventional optical communication systems such as 300, a receiver system 350 is located at the end of the communication system 300 to receive and detect information transmitted along the optical path. Receiver 350 may include demultiplexing circuitry for a wavelength division multiplexer application and may serve to detect and demodulate the optical carrier signal containing data modulated by data modulator 304 upstream in the optical communication system 300.

Figure 4:
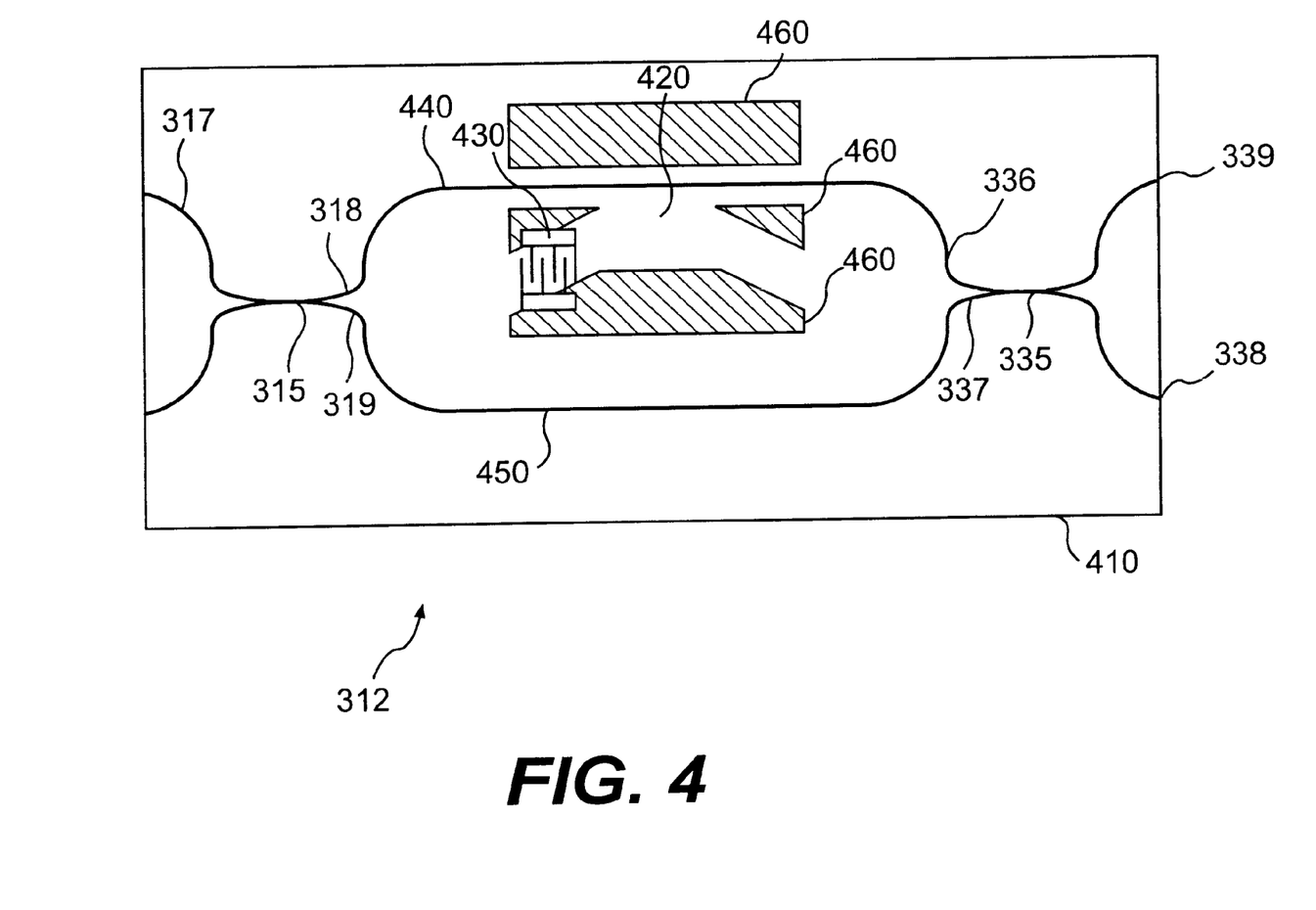
FIG. 4 is a top view of an embodiment of a polarization modulator for use in the optical communication system depicted in FIG. 3.

FIG. 4 illustrates a preferred embodiment for polarization modulator 312. Integrated acousto-optical devices, such as that shown as 312 in FIG. 4, are known whose operation is based on the interactions between light signals, propagating in waveguides obtained on a substrate of a birefringent and photo-elastic material, and acoustic waves propagating at the surface of the substrate, generated through suitable transducers. The interaction between a polarized optical signal and an acoustic wave produces a polarization conversion of the signal, that is, a rotation of the polarization of the optical signal's TE and TM components.

Polarization modulator 312 in FIG. 4 generally comprises a substrate 410, an optical coupler 315 formed with optical waveguides within substrate 410, an acoustic waveguide 420 on substrate 410, an electro-acoustic transducer 430, first optical waveguide branch 440, second optical waveguide branch 450, acoustic cladding 460, and polarization beam combiner 335.

The substrate 410 preferably is a crystal of lithium niobate (LiNbO$_3$) cut perpendicularly to the x-axis with optical waveguide branches 440 and 450 oriented along the crystal's y-axis. Alternatively, another birefringent, photo-elastic and piezoelectric material may be used, such as LiTaO$_3$, TeO$_2$, or CaMoO$_4$.

Coupler 315 is formed of an optical waveguide within substrate 410 and having an input 317 capable of being connected to an optical fiber (not shown) from upstream components in the optical communication system 300, such as polarization-fixing device 310. The output polarization of polarization-fixing device 310 is preferably selected so as to match the TE or TM propagation mode of optical waveguides 440, 450 of polarization modulator 312. Coupler 315 splits its optical path into first optical branch 440 at a first output 318 and a second optical branch 450 at a second output 319. Coupler 315 is substantially polarization independent.

First optical branch 440 passes through acoustic waveguide 420 to form an acousto-optic converter. The second optical waveguide branch 450 bypasses the acousto-optic converter and rejoins with the first optical waveguide branch 440 within polarization beam combiner 335.

Electro-acoustic transducer 430 is placed in acoustic waveguide 420, communicating with the first optical waveguide branch 440, so as to form the acoustic converter. The electro-acoustic transducer 430 is formed by interdigital electrodes capable of generating a radio-frequency (RF) surface acoustic wave. Optical signals received at input port 317 of coupler 315 and propagating along the first optical waveguide branch 440 interact with an acoustic wave propagating through acoustic waveguide 420. The acoustic wave within acoustic waveguide 420 is made so that the intensity profile of the surface acoustic wave has a peak in the central portion of the acoustic waveguide 420 and two troughs at the ends of the same waveguide. Optical signals propagating along the first optical waveguide branch 440 interact with the acoustic wave having an intensity increasing up to halfway along the path and decreasing in the other half in an area having a preselected interaction length. The acoustic waveguide 420 is circumscribed by acoustic cladding 460 wherein the speed of the acoustic waves generated by electro-acoustic transducer 430 is higher than in the acoustic waveguide 420.

The polarization beam combiner 335 is preferably formed by an evanescent wave polarization splitter, or directional coupler, comprising a central optical waveguide with pairs of input waveguides 336 and 337. The operation of polarization splitter/combiner 335 is described in EP 737,880 at col. 12–14, which document is incorporated by reference. Outputs 338 and 339 provide orthogonally-separated signals for exiting the modulator 312 for connection to an output optical fiber for transmission downstream in the optical communication system 300.

The operation of polarization modulator 312 of FIG. 4 according to the present invention is as follows. When an appropriate modulation signal, e.g., an RF signal of 172.6 MHz, is applied from modulation source 325 to electro-acoustic transducer 430, transducer 430 generates a respective RF surface acoustic wave having a driving acoustic frequency corresponding to the optical resonance wavelength, e.g., $\lambda=1556.7$ nm. At this resonance wavelength, the polarization conversion TE->TM or TM->TE takes place. Optical signals enter polarization modulator 312 from polarization-fixing device 310 with a fixed polarization of either TE or TM. As the received optical signals propagate through the first optical waveguide branch 440, they are transformed into their corresponding orthogonal components. That is, if the received signals have a polarization of TE, their polarization is rotated to its orthogonal component TM, or vice versa. Also, they receive frequency shifts with an absolute value equal to the RF signal frequency.

Polarization splitter, or combiner, 335 combines the modulated optical signal from first optical waveguide branch 440 with the unmodulated optical signal from second optical waveguide branch 450. Outputs 338 and 339 provide orthogonally-separated signals. Combining the polarization modulated and frequency shifted optical signal with the unmodulated signal results in the optical signal at output 338 with a rotating state of polarization. As described, this rotating state of polarization will occur at a rate dictated in part by RF source 325 and will preferably take place at a rate in excess of $1/t_s$, where $t_s$ is the anisotropic saturation time of a fiber amplifier, such as amplifier 340 shown in Fig. 3 downstream from polarization modulator 312. Consequently, polarization modulator 312 illustrated in FIG. 3 provides a concise and efficient implementation of an acousto-optic modulator for generating a polarization-rotating optical signal that helps to suppress polarization hole burning in an EDFA.

Figure 5:
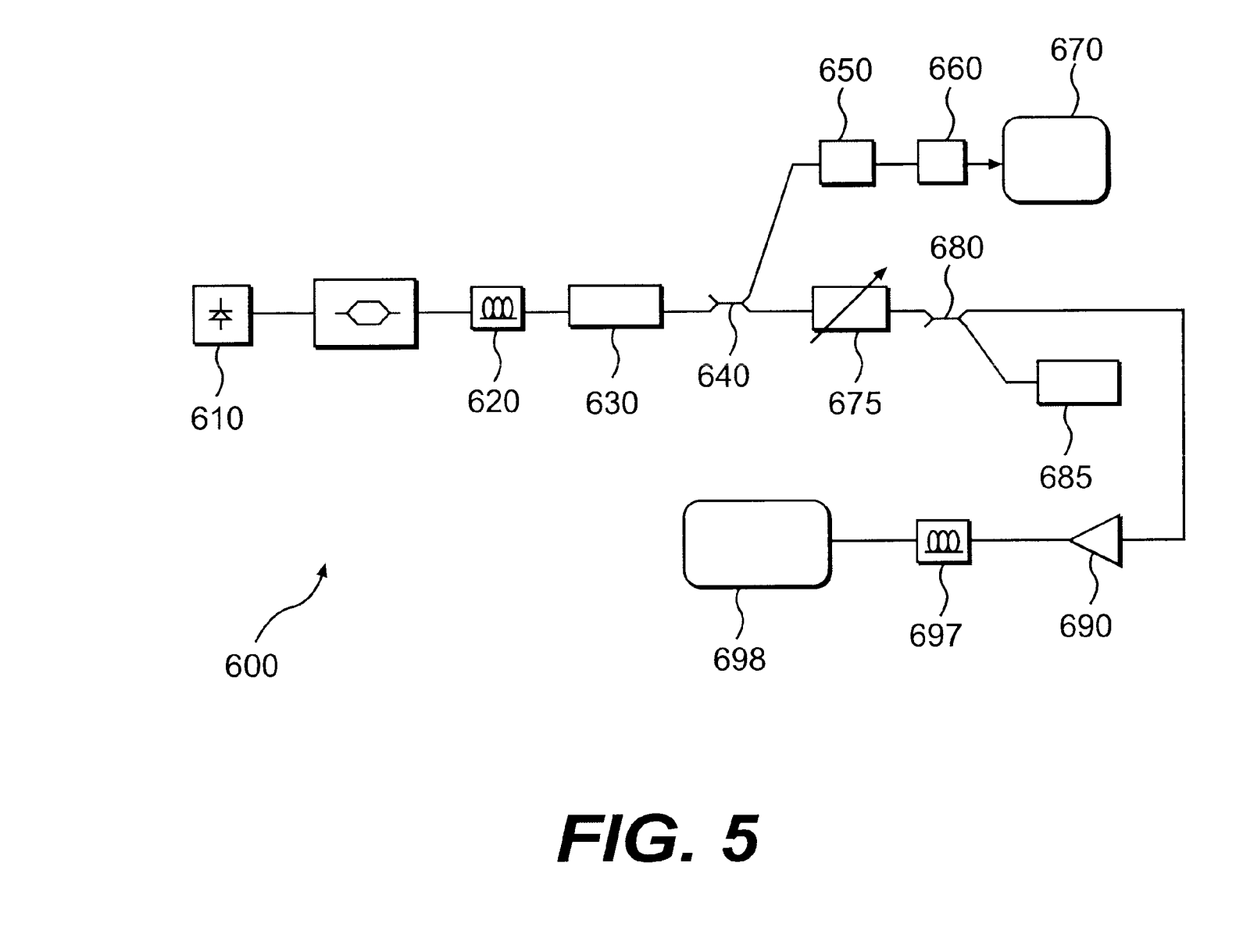
FIG. 5 is a block diagram of an experimental setup for the optical communication system depicted in FIG. 3.

The following describes the experimental tests and results for the present invention as previously set forth. FIG. 5 illustrates a test setup generally referenced at 600 for experimentally analyzing the optical communication system and transmitter of FIG. 3. As shown in FIG. 5, an optical source 610 in the form of a laser diode (AT&T Model 246AH) operating at a nominal wavelength of 1556.7 nm in vacuum provided an optical carrier signal to a polarization controller for 620. Polarization controller 620 was a series of optical fiber loops arranged to have an angular displacement for controlling the polarization of the optical carrier received from laser source 610. An output from the polarization controller 620 was optically coupled to a polarization modulator 630, which comprised the components of polarization modulator 312.

At the output of the polarization modulator 630, the test setup depicted generally as 600 in FIG. 5 included a coupler 640 that split the output signal from polarization modulator 630 in a 90:10 ratio. Ten percent (10%) of the polarization modulator output was split by coupler 640 and fed through polarizing filter 650 and photodiode 660 so that it could be detected and analyzed within oscilloscope 670. Coupler 640 directed 90% of the output from polarization modulator 630 to an attenuator 675. Another coupler 680 having a splitting ratio of 90:10 was positioned downstream from attenuator 675 and split 10% of the signal from attenuator 675 to a power meter 685 for detection. Coupler 680 divided 90% of the output signal from attenuator 675 and passed it to an erbium-doped fiber amplifier 690. Amplifier 690 was a double stage EDFA pumped with 1480 nm laser diodes. For an input power of −15 dBm, the amplifier had an output power of 9 dBm, a gain G=24 dB, $G_c$=12dB, $N_f$=6.5 dB, $\gamma$=0.92, and $P_{sat}$=0.94 $\mu$W. After amplifying the received polarization-rotating carrier signal from coupler 680, EDFA 690 passed the signal through polarization controller 697 to an optical signal analyzer 698 for detection and analysis. Polarization controller 697 was used to set the polarization of the amplified signal received from EDFA 690 to a state acceptable by the optical signal analyzer 698.

Figure 6:
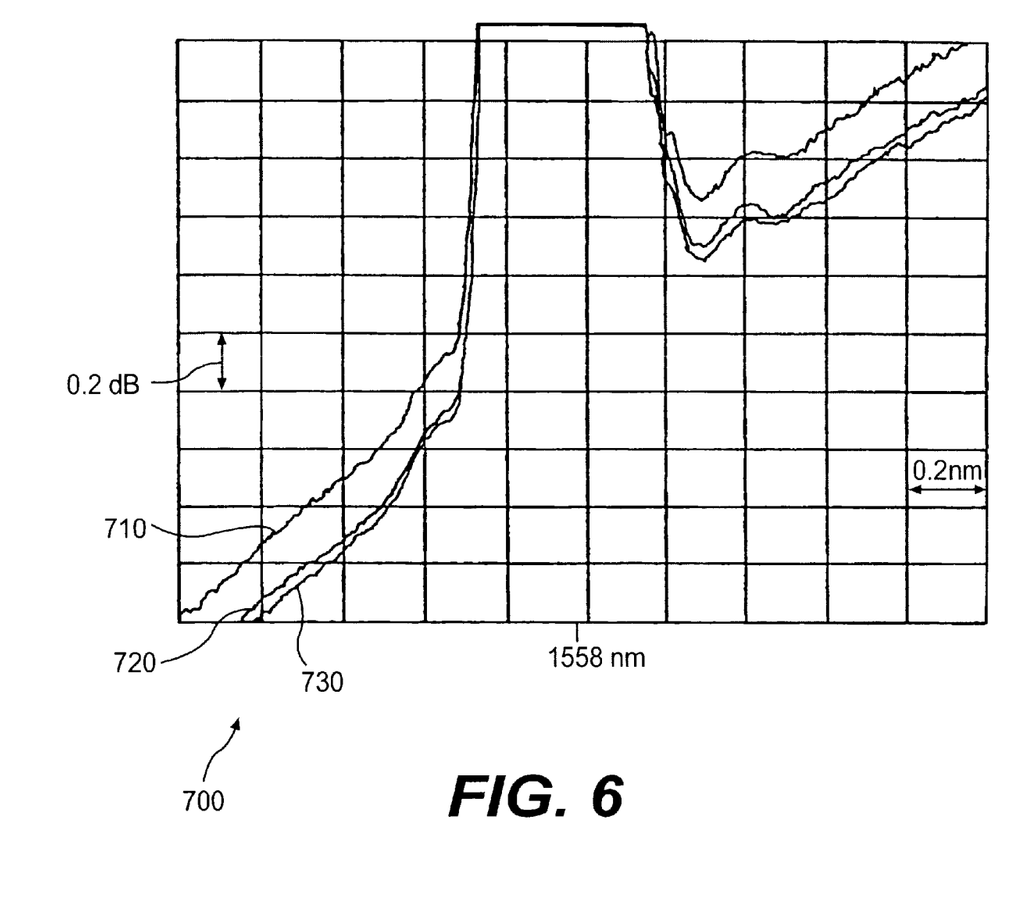
FIG. 6 is a graph showing experimental results using the test setup of FIG. 5.

FIG. 6 shows the graphical test results obtained by optical signal analyzer 698 under various test conditions and referenced generally as 700. Signal trace 710 depicts the spectra received at the output of EDFA 690 when no modulation or rotation of the signal polarization was implemented. In other words, signal 710 in FIG. 6 illustrates the output from EDFA 690 when the input signal to that amplifier had a degree of polarization equal to 100%. Signal trace 720 depicts the output from EDFA 690 when the degree of polarization of the input signal was 36%. Signal trace 730 shows the output signal from EDFA 690 with an input signal that had a degree of polarization of 6%, as received downstream from polarization modulator 630.

As shown in FIG. 6, the amplified spontaneous emission (ASE) noise was the highest in signal 710 with a degree of polarization of 100%, and least in signal trace 730 with an input signal having a degree of polarization equal to 6%. Comparing the two results in signal traces 710 and 730, it can be seen that the ASE noise drops by about 0.24 dB when the polarization modulator 630 is used. This drop in ASE noise corresponds approximately to the quantity of gain variation caused by polarization hole burning present in an EDFA with a polarized saturating signal. In particular, FIG. 2 shows that for 10 dB of gain compression, the polarization hole burning in decibels corresponds to about 0.2 dB for a degree of polarization equal to 100%. Thus, polarization modulator 630 provides a significant decrease in signal fading caused by polarization hole burning.

Applicants have also determined that the above-described invention is effective in reducing polarization hole burning in wavelength-division-multiplexing (WDM) optical transmission systems. As is readily known to one of ordinary skill in the art, in a WDM system, a plurality of optical sources generates carrier frequencies for the channels in the transmission system. One or more of the channels is modulated with information, and the channels are multiplexed and then transmitted down a common optical fiber. Repeaters or optical amplifiers along the transmission path may boost the channel levels for passage across a long distance. At a receiver end, a demultiplexer separates the channels to respective paths, and a receiver obtains the modulated information from a particular channel. For such a WDM system, polarization hole burning can be reduced by using a single polarization modulator as described above that is positioned downstream from the multiplexer. In this fashion, the polarization of all the channels in the WDM system can be rotated. Alternatively, a plurality of polarization-rotating modulators can be used prior to multiplexing all the channels so that a group of adjacent or interleaved channels may have their polarization individually rotated. Furthermore, Applicants believe that polarization hole burning can be reduced in a WDM system by rotating the polarization of less than all of the channels in the WDM system, and even only one channel in the WDM system.

It will be apparent to those skilled in the art that various modifications and variations can be made to the system and method of the present invention without departing from the spirit or scope of the invention. The present invention covers the modifications and variations of this invention provided they come within the scope of the appended claims and their equivalents.

What is claimed is:

1. An apparatus for reducing polarization hole burning in a rare-earth-doped fiber amplifier within an optical communication system by converting an optical carrier having a characteristic wavelength and an initial state of polarization into a polarization-rotating optical carrier, comprising:

an acousto-optic modulator having a carrier input optically coupled to receive a first portion of the optical carrier, a modulation input electrically coupled to receive a modulation frequency, and a modulator output, the acousto-optic modulator including circuitry for orthogonally converting the polarization of the polarized optical carrier and shifting the polarized optical carrier frequency by the modulation frequency; and a polarization beam combiner having a first input optically coupled to receive the orthogonally-polarization converted and frequency-shifted polarized signal, a second input optically coupled to receive a second portion of the optical carrier, and an output optically coupled to the rare-earth-doped fiber amplifier downstream in the optical communication system.

2. The apparatus according to claim 1, further comprising:

a polarization-fixing device optically coupled to the carrier input to transform the initial state of polarization of the optical carrier to a predetermined state of polarization.

3. The apparatus according to claim 2, wherein the polarization-fixing device is one of a polarization controller, polarization-maintaining fiber, and polarization stabilizer.

4. The apparatus according to claim 1, further comprising:

an attenuator coupled to the second input of the polarization beam combiner for attenuating the second portion of the optical carrier to a magnitude substantially equal to a magnitude of the orthogonally-polarization converted and frequency-shifted polarized signal.

5. The apparatus according to claim 1, further comprising:

a splitter coupled to the carrier input of the acousto-optic modulator and the second input of the polarization beam combiner, the splitter providing a higher magnitude of the optical carrier to the carrier input than to the second input.

6. The apparatus according to claim 1, wherein the modulation frequency is about 172 MHz.

7. An optical transmitter for reducing polarization hole burning in a rare-earth-doped fiber amplifier within an optical communication system, comprising:

an optical source for transmitting an optical carrier having an initial state of polarization;

a splitter, positioned downstream from the optical source, having an input, a first output, and a second output, and dividing the optical carrier received at the input between the first output and the second output;

a modulation source for providing a modulation signal;

an acousto-optic modulator having a carrier input optically coupled to the first output of the splitter, a modulation input electrically coupled to the modulation source, and a modulator output, the acousto-optic modulator including circuitry for orthogonally converting polarization of the optical carrier and frequency shifting the optical carrier by the frequency of the modulation signal;

an attenuator optically coupled to the second output of the splitter; and a polarization beam combiner having a first input optically coupled to receive the orthogonally polarization converted and frequency-shifted optical signal, a second input optically coupled to the attenuator, and an output optically coupled to the rare-earth-doped fiber amplifier downstream in the optical communication system.

8. The apparatus according to claim 7, further comprising:

a polarization-fixing device optically coupled to the input of the splitter to transform the initial state of polarization of the optical carrier to a predetermined state of polarization.

9. The apparatus according to claim 8, wherein the polarization-fixing device is one of a polarization controller, polarization-maintaining fiber, and polarization stabilizer.

10. The apparatus according to claim 7, wherein frequency of the modulation signal is about 172 MHz.

11. A method of suppressing polarization hole burning in a rare-earth-doped fiber amplifier within an optical communication system, comprising the steps of:

splitting an optical carrier signal into a first sub-carrier signal and a second sub-carrier signal;

rotating orthogonally polarization of the first sub-carrier signal and modulating the first sub-carrier signal with a modulation frequency to create an orthogonal-modulated sub-carrier signal;

combining the orthogonal-modulated sub-carrier signal and the second sub-carrier signal in a polarization beam combiner to produce a polarization-rotating carrier signal; and passing the polarization-rotating carrier signal downstream in the optical communication system to the rare-earth-doped fiber amplifier.

12. The method according to claim 11, further comprising the step of:

fixing a state of polarization of the optical carrier signal prior to splitting the optical carrier signal.

13. The method according to claim 11, further comprising the step of:

attenuating the second sub-carrier signal prior to combining the second sub-carrier signal with the orthogonal-modulated sub-carrier signal.

14. The method according to claim 13, wherein the attenuating step includes the substep of:

attenuating the second sub-carrier signal to a magnitude substantially equal to a magnitude of the orthogonal-modulated sub-carrier signal.

15. The method according to claim 11, wherein the splitting step includes the substep of:

splitting the optical carrier signal into the first sub-carrier signal with a magnitude greater than a magnitude of the second sub-carrier signal.

* * * * *